G. T. & A. SMITH.

Flour-Bolt.

No. 6,619.

Reissued Aug. 24, 1875.

Witnesses.
Henry Otto
A. B. Paige.

Inventors.
George T. Smith
Aaron Smith
by H. H. Doubleday
atty.

UNITED STATES PATENT OFFICE.

GEORGE T. SMITH, OF MINNESOTA CITY, AND AARON SMITH, OF HASTINGS, MINNESOTA.

IMPROVEMENT IN FLOUR-BOLTS.

Specification forming part of Letters Patent No. 135,496, dated February 4, 1873; reissue No. 6,198, dated December 29, 1874; reissue No. 6.619, dated August 24, 1875; application filed April 1, 1875.

*To all whom it may concern:*

Figure 1:
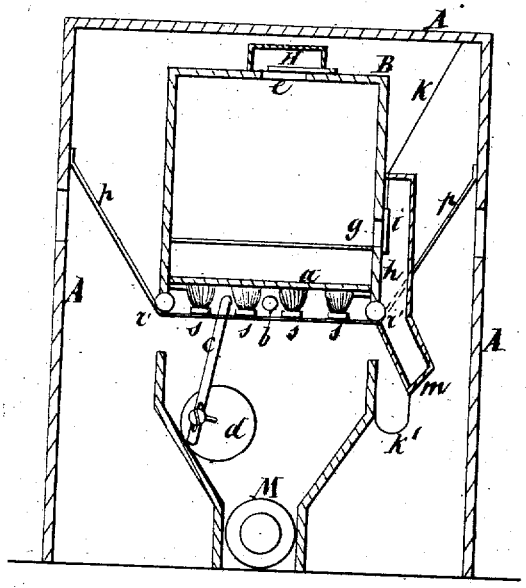
Figure 2:
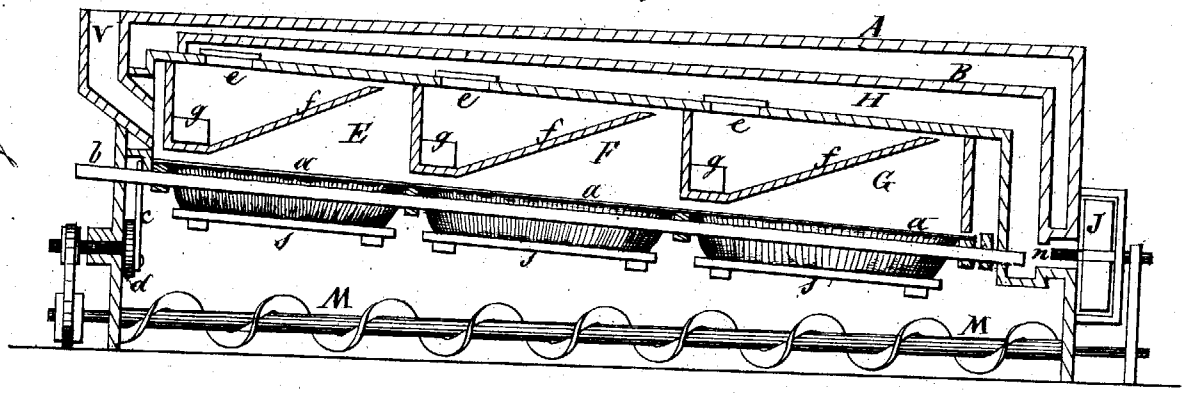

Be it known that we, GEORGE T. SMITH, of Minnesota City, Minnesota, and AARON SMITH, of Hastings, Minnesota, have invented a Flour-Dressing Machine, of which the following is a specification:

In the drawings, Figure 1 is a vertical transverse section, showing spouts attached to the air-chamber or bolting-case, and adapted to receive material through openings in said air-chamber. Fig. 2 is a vertical longitudinal section.

A is the frame-work and casing. Inside this casing is a bolting-case, B, closed, except as hereinafter mentioned, at the top, sides, and ends, and having a bolting-cloth, *a*, across the bottom. The case rests upon, and is oscillated on, shaft *b* by means of pitman *c* and crank-wheel *d*. The bolting-case or air-chamber is divided by transverse partitions into three sections, E F G, each having an adjustable opening, *e*, at the top into the air-trunk H. This trunk passes over the top of the air-chamber, and down its rear end until it meets and opens into a tube, *n*, which passes through case A into the suction-fan J. In each section of the air-chamber is an inclined shelf, *f*, forming, with the front end of the air-chamber and the transverse partitions, pockets, for a purpose which will be explained. *g g g* are openings through the side of the air-chamber into spouts *h*. Each of these openings is provided with a sliding gate, *i*, having a cord, *k*, the upper end of the cord being attached to the top of case A. Each spout has, at the bottom, a gate, *m*, with a cord, *k'*, connecting it with the gather-boards, and a retracting-spring. *s s s* are brushes, arranged below the bolting-cloth, against which they are supported by means of belts *r r*. The ends of the belts are attached to the outer case. The central portions, which carry the brushes while they (the brushes) are traversing the bolting-cloth, pass over guide-rollers *r'*, which serve to maintain said brushes in proper working relation to the cloth. V is a hopper, for feeding the material to the bolt. *m* is the conveyer, and we prefer to connect it with the driving-power, and to belt from it to the crank-wheel *d* and fan J.

The material to be treated is fed in through the hopper V, and is, when the bolt is oscillated, thrown from side to side, sliding across the bolt-cloth. As the air-currents are drawn through the cloth by the suction-fan J, the lighter portion of the bran and specks passes over the tops of the shelves *f*, some of it being carried off through the fan, and some falling to the bottom of the shelves. As the bolt is oscillated toward the side on which the spouts are placed, the material or refuse which has collected in each of the pockets formed above the shelves is discharged through the gate *i*, which is opened by cord *k*, the reverse motion permitting this gate to close, and opening gate *m* by means of cord *k'*, thus letting the refuse fall from the spout.

It is apparent that were the center, about which the bolting-chamber oscillates, raised, it would increase the distance over which each brush would travel and sweep the cloth. Thus the number of brushes for each section of cloth might be reduced.

The head or receiving end of the bolt being the highest, the meal moves gradually toward the lowest or discharging end; and as the finest cloth is placed at the head, the finest portion of the specks may be taken out at that point by a light draft of air, while the purified fine material is sifted through. The coarser specks and particles of bran may be drawn out in the next section of the air-chamber, the bolt-cloth being coarser, and so on.

In some of the machines employed before the date of our invention, the air-chamber is arranged below the bolting-cloth, and is divided into sections by means of transverse partitions; and it is apparent that it would be difficult, if not impracticable, to use with this construction brushes which traverse the bolt lengthwise, whereas brushes arranged to travel crosswise of the bolt-cloth would not be interfered with by these partitions.

So, also, brushes which travel lengthwise of the machine are liable to carry the fine and clean material from the head of the bolt and deposit it at the tail of the machine with the coarse and imperfectly-cleaned portion, and to bring, when returning, more or less imperfectly-cleaned material, and deposit it with the fine and better purified. This difficulty is also obviated by arranging the brushes to traverse the bolt-cloth from side to side.

We do not, in this division or reissue, make any claim to the pockets above the bolting-cloth, nor to the openings through the bolting-case or air-chamber into these pockets, nor to the oscillating bolt, these devices being embraced in reissued Letters Patent No. 6,197, granted to us December 29, 1874; but What we do claim is—

1. In combination with a flour-bolting surface having different numbers of cloth, adapted to deliver the material in different grades of fineness, a movable or traveling brush, or a series of movable or traveling brushes, below the bolt-cloth, and arranged on a line or lines parallel with the conveyer of the machine, and moving at right angles thereto, for cleaning the bolt-cloth without carrying material lengthwise of the machine, substantially as set forth.

2. In a flour-bolting machine having different numbers of cloth, adapted to deliver the material in different grades of fineness, and having an air-chamber divided into sections by means of transverse partitions or walls, a series of brushes, each shorter than the spaces between said walls or partitions, and so arranged that each brush shall traverse a section of cloth corresponding to a section of the air-chamber, substantially as set forth.

In witness that we claim the foregoing we hereunto set our hands.

GEORGE T. SMITH.
AARON SMITH.

Witnesses to GEORGE T. SMITH:
SAML. KNIGHT,
C. H. BROWN.

Witnesses to AARON SMITH:
R. MILLER,
JNO. MCLEAN.